J. J. Doyle,
Meat Tenderer,
No. 50,921.  Patented Nov. 14, 1865.
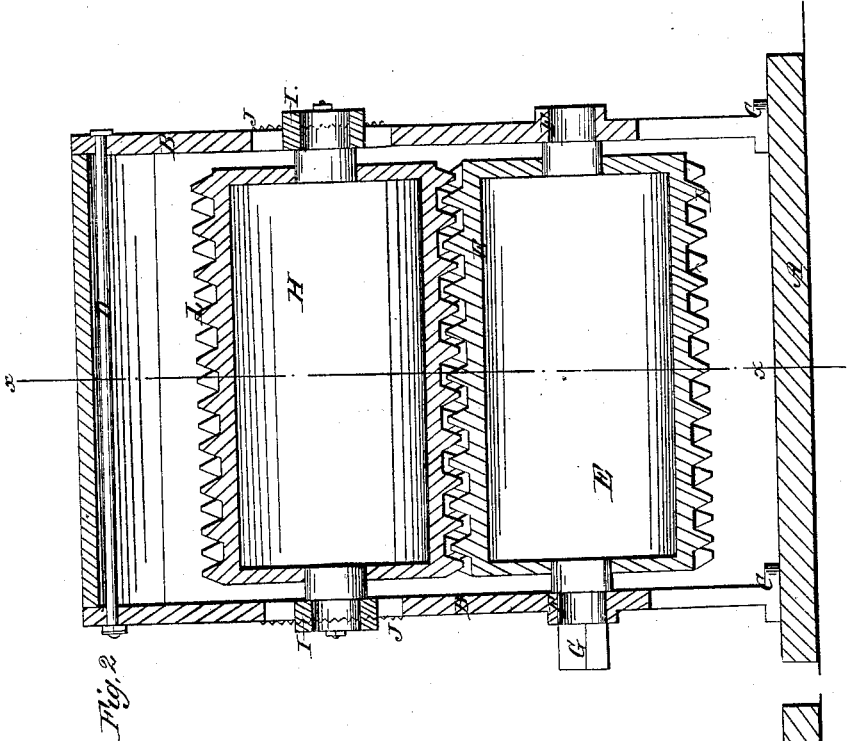
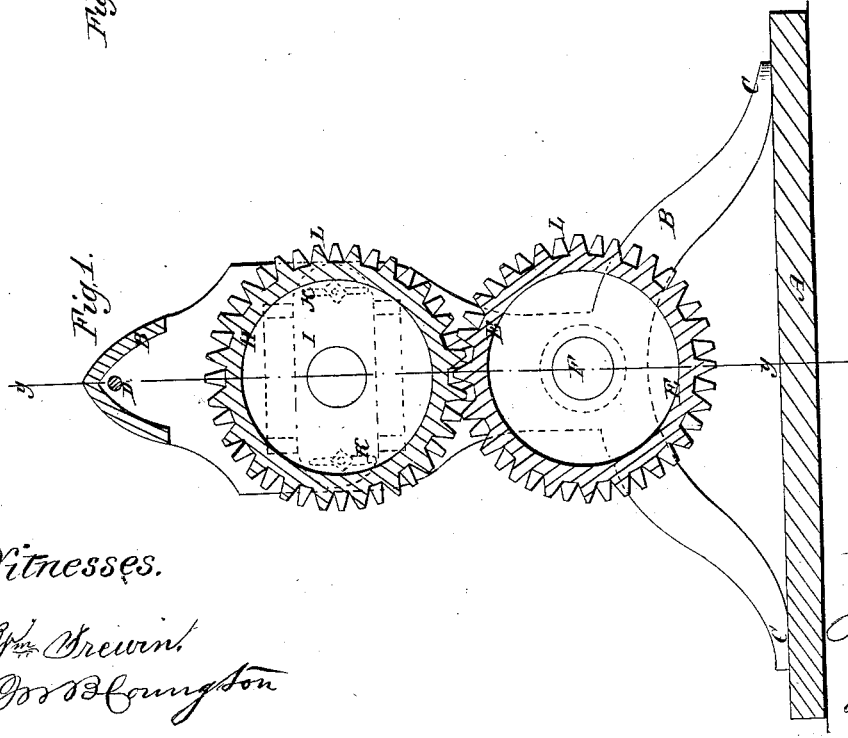
Witnesses.
Inventor.

UNITED STATES PATENT OFFICE.

JAMES J. DOYLE, OF SHARON, CONNECTICUT.

IMPROVED BEEFSTEAK-CRUSHER.

Specification forming part of Letters Patent No. 50,921, dated November 14, 1865.

*To all whom it may concern:*

Be it known that I, JAMES J. DOYLE, of Sharon, in the county of Litchfield and State of Connecticut, have invented a new and useful Improvement in Beefsteak-Crushers; and I do hereby declare that the following is a full, clear, and exact description thereof, which will enable those skilled in the art to make and use the same, reference being had to the accompanying drawings, forming part of this specification, in which—

Figure 1 is a vertical cross-section through the line $x\ x$, Fig. 2. Fig. 2 is a vertical longitudinal section through the line $y\ y$, Fig. 1.

The object of my invention is to furnish an instrument by means of which beafsteak may be made tender and prepared for cooking without being mashed into a shapeless mass; and it consists of combining two cylinders whose surfaces are covered with teeth made in the form of truncated square pyramids with each other and with the frame in which they are placed, as hereinafter more fully described.

A is the foundation-board or table to which the instrument is attached or upon which it stands.

B is the frame of the crusher, the feet C of which may be screwed fast to the board or table A.

D is a rod or bar, by means of which the upper end of the frame B is held in position. The lower roller or cylinder, E, revolves in bearings F in the sides of the frame B.

To the end G of the axle of the cylinder E is attached a crank, by means of which the cylinder E is revolved. The cylinder H revolves in adjustable bearings I in the sides of the frame B. The blocks which form the bearings I are placed in an opening or slot in the sides of the frame B.

Upon the parts of the frame B which form the sides of the slots in which the bearings I are placed are formed a series of corrugations, J. The blocks which form the bearings I have shoulders projecting over the corrugations J, the under side of which shoulders are corrugated to correspond to said corrugations, as shown at I, Fig. 2.

The blocks which form the bearings I are held in place by bolts which pass through the said projecting shoulders of the blocks and through the sides of the frame B, said projecting shoulder being slotted, as represented at K, Fig. 1, to allow said blocks to be moved up or down, as required; but the bearings I may be made adjustable by means of a spring placed between the blocks and the upper side of the slots in which said blocks are placed, the ends of the blocks working up and down in grooves in the sides of the frame B. In this case the corrugations J and the projecting shoulders of the blocks will be left off and the outer side of the blocks made flush with the outer sides of the frame B. This latter mode of adjustment I prefer, as it enables the instrument to adjust itself to the variations in thickness of the steak which may be passing between the rollers.

The teeth or projections L of the cylinders E and H are made in the form of truncated square pyramids, arranged in rows, with a space between the adjacent teeth about equal to the base of each tooth, the teeth of each row being placed opposite the spaces of the previous row. The teeth of the cylinder H mesh into the teeth of the cylinder E, and in this way motion is given to the cylinder H.

What I claim as new, and desire to secure by Letters Patent, is—

A beefsteak-crusher formed by combining the cylinders E and H, constructed substantially as described, with each other and with the frame B, substantially as described, and for the purpose set forth.

The above specification of my invention signed by me this 6th day of October, 1865.

JAMES J. DOYLE.

Witnesses:
M. M. LIVINGSTON,
C. L. TOPLIFF.